Figure 1:
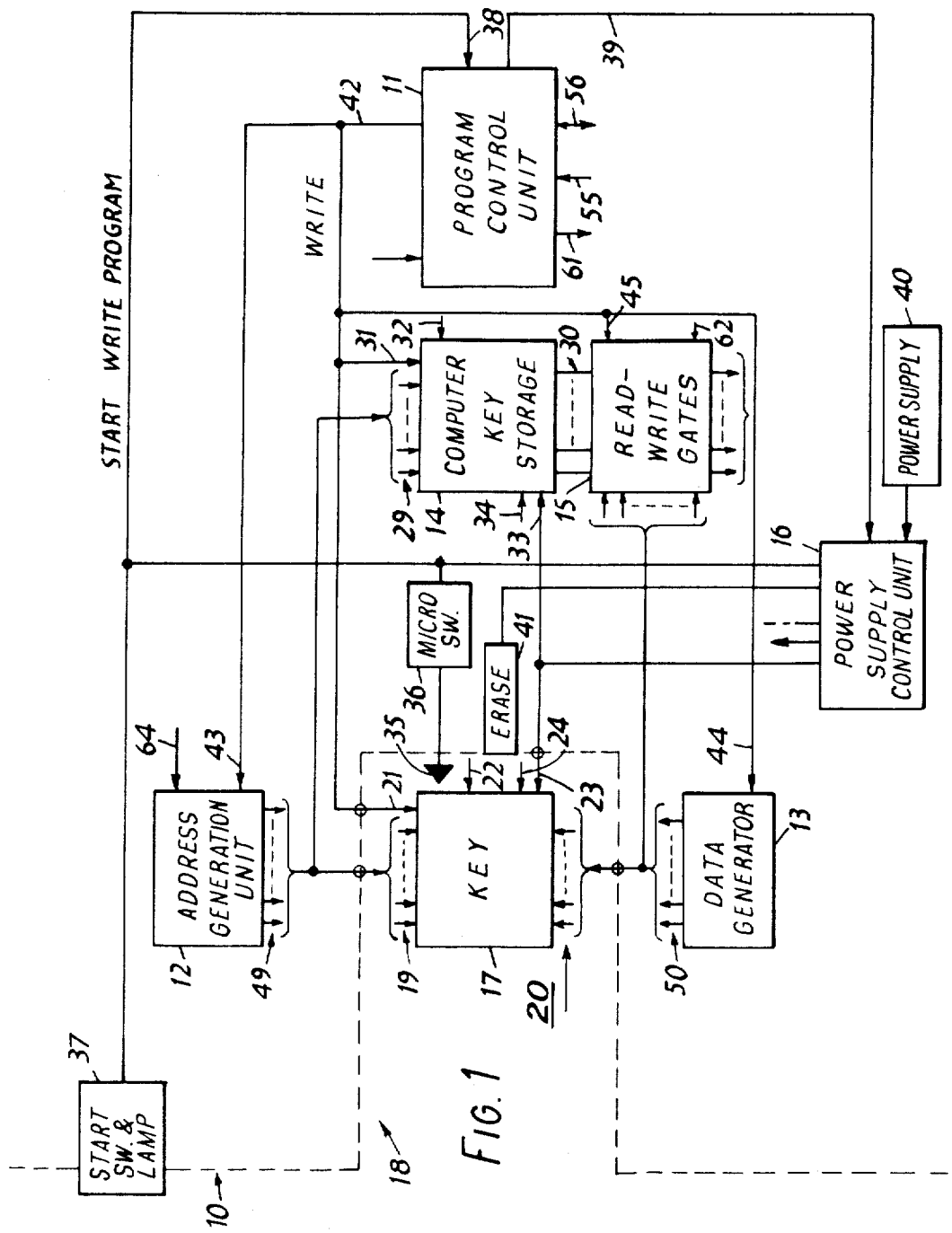

United States Patent [19]

Clarke

[11] 3,806,882

[45] Apr. 23, 1974

[54] SECURITY FOR COMPUTER SYSTEMS

[76] Inventor: Alan Bothwell Clarke, Cambrae, Park View Rd., Pinner, England

[22] Filed: Nov. 13, 1972

[21] Appl. No.: 306,254

[30] Foreign Application Priority Data
Nov. 22, 1971  Great Britain...................... 54174/71

[52] U.S. Cl........ 340/172.5, 340/149 R, 235/61.7 R
[51] Int. Cl............................. G06f 1/00, G05b 1/00
[58] Field of Search......... 340/172.5, 149 A, 149 R; 235/61.7 B, 61.12 C, 61.12 N, 61.12 M

[56] References Cited
UNITED STATES PATENTS

| R27,251 | 12/1971 | Amdahl et al. | 340/172.5 |
|---|---|---|---|
| 3,264,615 | 8/1966 | Case et al. | 340/172.5 |
| 3,368,207 | 2/1968 | Beausoleil et al. | 340/172.5 |
| 3,377,624 | 4/1968 | Nelson et al. | 340/172.5 |
| 3,508,205 | 4/1970 | Kubie | 340/172.5 |
| 3,609,697 | 9/1971 | Blevins | 340/172.5 |
| 3,629,834 | 12/1971 | Randall et al. | 340/149 |
| 3,641,315 | 2/1972 | Nagata et al. | 235/61.7 B |
| 3,648,020 | 3/1972 | Tateisi et al. | 235/61.7 B |
| 3,657,702 | 4/1972 | Stephenson | 340/149 R |
| 3,694,810 | 9/1972 | Mullens | 340/149 R |

Primary Examiner—Paul J. Henon
Assistant Examiner—James D. Thomas
Attorney, Agent, or Firm—Lawrence Rosen; E. Janet Berry

[57] ABSTRACT

A computer security system and method in which access to information stored in the computer is only made available in response to correct identifying data stored in an electronic key which is coupled to the computer to be identified. The key includes at least one ramdom access permanent memory device.

11 Claims, 2 Drawing Figures

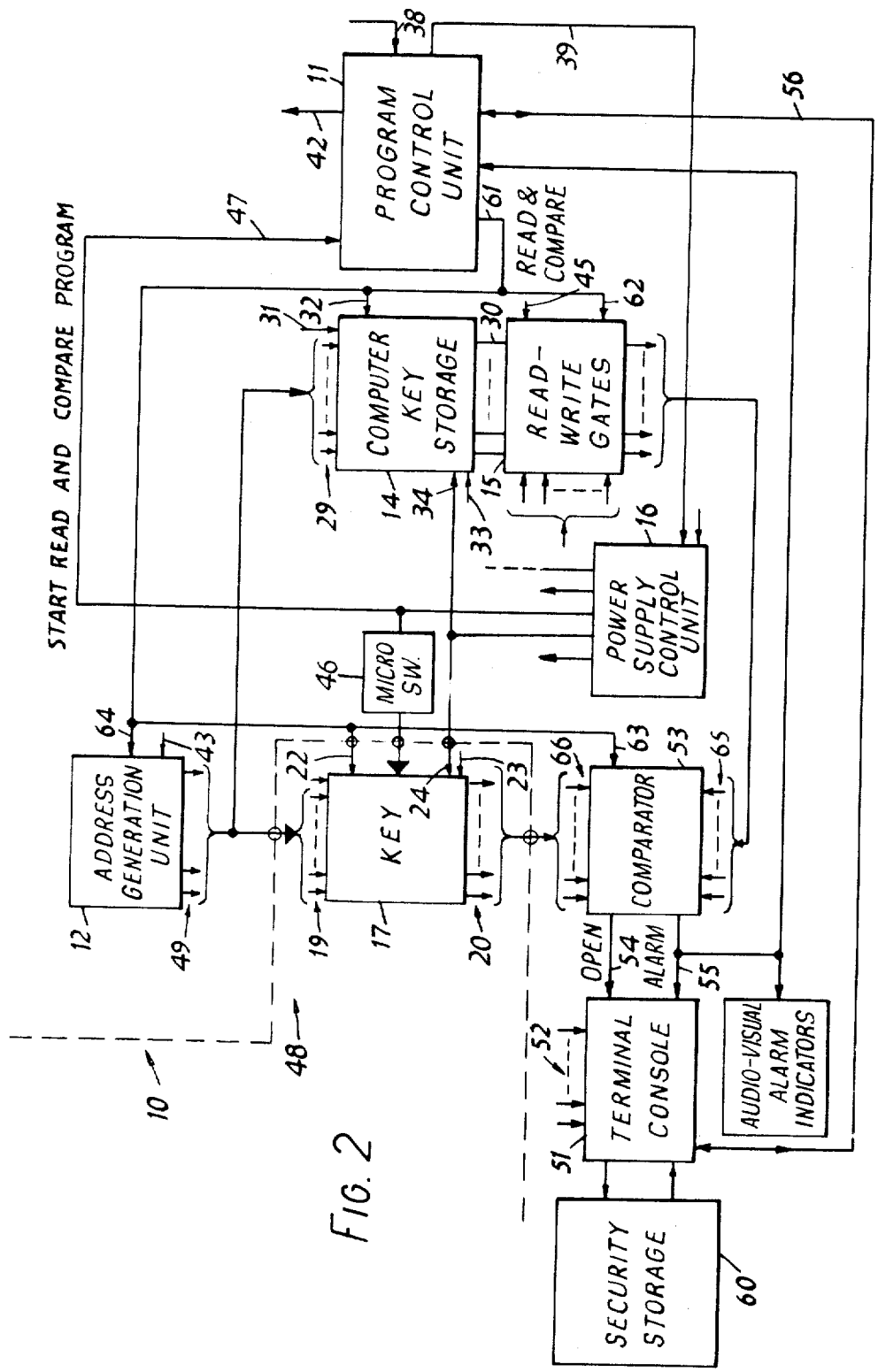

SECURITY FOR COMPUTER SYSTEMS

BACKGROUND OF THE INVENTION

This invention relates to the provision of security for computer systems containing information.

It is highly desirable that information stored in a computer should not be accessible to unauthorised persons. For example, government departments and industrial and commercial companies nowadays hold large amounts of information relating either to individuals or to technical and scientific matters or to business operations which, in the hands of the wrong persons, could be damaging if abused. There is therefore a great need for a system of security which will eliminate so far as practically possible the likelihood for such information stored in computers being obtained by unauthorised persons.

SUMMARY OF THE INVENTION

According to one aspect of the present invention there is provided a combination of a key containing predetermined data, and a computer system having a storage for information and means for identifying the said data when the key is arranged to communicate with the system, the system being such that the said storage is accessible only in response to identification of the said data, and the key including at least one random access permanent memory device.

According to another aspect of the present invention there is provided a method of operating a computer system including a storage means containing information, the method including the steps of bringing a key containing predetermined data into communication with the system, identifying the data by an operation of the system, and providing access to the said information only in response to the identification of the said data, the said key including at least one random access permanent memory device.

Preferably the key is such that data can be erased therefrom and written therein non-destructively, and preferably the computer system is adapted to erase data in the key and write new data therein subsequently when the key is presented to the system for erasure and writing.

The computer system is preferably adapted to provide warning indications and to render the said storage inaccessible if a key is brought into communication with the system and the system is unable to identify the data therein.

The best example of an embodiment of the invention known to the inventor will now be described with reference to the accompanying drawings in which:

FIG. 1 is a block diagram of part of a computer system with a key connected to be supplied with encoded data, and FIG. 2 is a block diagram of part of the same computer system with the key connected to open communication channels between a data terminal and a store containing restricted information.

In FIG. 1 there is shown part 10 of a computer system including a program control unit 11 for controlling an address generation unit 12, a data generator 13, a computer key storage 14, a read-write gates unit 15, a power supply control unit 16, and other units of the system, and for controlling the storing of data in a key 17 when located in an "encode" socket 18 indicated schematically in FIG. 1.

The key 17 houses a random access memory which is permanent, i.e. random access storage device in which data stored is not mutilated when no power is supplied and is available when power is supplied. It has eight address input terminals 19 and eight data input-/output terminals 20, each location in the device being capable of storing an eight-bit word. Data stored in the key 17 can be erased by subjecting the key to electromagnetic radiation of a given frequency. A write signal input terminal 21 provided on the key 17 enables a WRITE signal when applied thereto to condition the key to store data in its 256 locations. A read signal input terminal 22 is also provided on the key 17 and enables a READ signal when applied thereto to condition the key to be read. The terminals 21 and 22 may, depending on the nature of the key, be one and the same terminal.

A suitable device to constitute the key 17 is the ML 1701 available from Microsystems International Limited and also manufactured by Intel Corporation of the United State of America. The ML1701 is a 24-pin, dual-in-line, ceramic package having a quartz lid, and data stored in it can be erased by subjecting the device to ultra-violet radiation. It takes 15 minutes to encode, and can retain 256 eight-bit words. This device belongs to a family of devices which includes ML1101, ML11011, ML1301 and ML 1601. The ML1101 and ML11011 devices are MOS LSI memories and are described in Bulletin 23002 issued by Microsystems International Limited of Ottawa. The ML1301 device is a non-erasable permanent memory in which the data is stored by mask preparation and processing during manufacture.

The key 17 has two sets of power input terminals, i.e., write level power input terminals 23, and read level power input terminals 24. When power is supplied at a first voltage to the write level power input terminals 23, data can be stored in the device, and when power is supplied at a second voltage to the read level power input terminals 24 the stored data can be read.

The computer key storage 14 is another random access memory which is permanent, has eight address input terminals 29, eight data input/output terminals 30, 256 locations each capable of storing an eight-bit word, a write signal input terminal 31, a read signal input terminal 32, write level power input terminal 33, and read level power input terminals 24. The computer key storage 14 is capable of storing the same data in corresponding locations as is the key 17 and may be another of the devices of which the key 17 is an example. For instance, the computer key storage 14 may also be an ML1701 device, in which case provision is made for subjecting the computer key storage 14 to ultra-violet radiation.

When the key 17 is correctly located in the encode socket 18, its terminals 19 to 23 make electrical contact with corresponding terminals in the socket 18, the correct location of the key being indicated to the program control unit 11 by a mechanical sensor 35 adapted to actuate a microswitch 36 connected in a circuit from the power supply control unit 16 to the program control unit and including a start switch and lamp unit 37. The start switch is manually operable and must be closed by an operator when inserting the key 17 in the socket 18 before the circuit can be completed by the microswitch 36. Closure of the circuit is indicated to the operator by energisation of the lamp of the start switch and lamp unit 37, and results in the application of a signal, designated the START WRITE PROGRAM signal in FIG. 1, to a start input terminal 38 of the program control unit 11. The program control unit 11 is such that, on receiving this signal, it issues supply control signals through a supply control channel 39 to the power supply control unit 16 which in response thereto, and being such as to control the distribution of power from a power supply 40 connected thereto, initially allows power to be supplied to an erase unit 41 which operates to erase the information stored in the key 17 and the computer key storage 14. Where the key 17 and the computer key storage 14 are ML 1701 devices, the erase unit 41 is an electrically actuable source of pulses of ultra-violet radiation adapted to direct the emitted radiation onto the appropriate regions of the key 17 and the storage 14. If only the key 17 is an ML1701, the storage 14 being some other suitable device in which stored information can be erased electrically, the erase unit consists of a source of ultraviolet radiation for the key 17, and a source of an electrical erase signal supplied to the storage 14.

At a suitable time after the erasure has been effected, the power supply control unit 16 supplies a voltage of the appropriate magnitude and polarity to the write level power input terminals 23 and 33. This voltage is maintained while the program control unit 11 issues a WRITE signal through a write control channel 42 which is connected to the write signal input terminals 21 and 31 of the key and the computer key storage, and to write signal input terminals 43, 44 and 45 of the address generation unit 12, the data generator 13, and the read-write gates 15 respectively.

The address generation unit 12 has eight address output terminals 49 which are connected, through respective ones of the terminals in the socket 18, to respective ones of the address input terminals 19 of the key 17, and also to respective ones of the address input terminals 29 of the computer key storage 14 so that addresses generated by the unit 12 in response to a WRITE signal are supplied to the key 14 and the storage 17.

Similarly the data generator 13 has eight address output terminals 50 which are connected through respective ones of the terminals in the socket 18 to respective ones of the data input terminals 20 of the key 17, and through respective gates in the read-write gates unit 15 to respective ones of the date input terminals 30 of the computer key storage 14 provided that a WRITE signal is present at the terminal 45 of the read-write gates unit 15.

Thus the data generated can be stored in corresponding locations, i.e. locations having the same addresses, in the key 17 and the computer key storage 14.

When all the locations of the key and the computer key storage have been filled with data, i.e. there is a word in each location, the WRITE signal is terminated by the program control unit 11, and the power control signals cause the operator to be given a signal, which may be the extinction of the start lamp of the unit 37, indicating completion of writing. The key 17 can then be removed from the socket 18 and carried by the operator to enable him to have access to restricted information stored in the computer system or issued by the operator to another person for the same purpose.

The address generation unit 12 and the data generator 13 include respective random number generators by means of which, respectively, the address of each word of the information stored in the key 17 and the computer key storage 14 is made random, and the nature of each word is made random. The random element of each random number generator may be, for example, an electrical noise source such as a diode with appropriate amplifying means, or a pseudo-random noise generator such as a chain code generator.

Alternatively a single random number generator may be included in the program control unit 11 which is then adapted to supply a random number output signal to the address generation 12 and the data generator 13 as and when required, for example to both when the WRITE signal is present.

The computer system contains in addition to the items shown in FIG. 1 further items which are shown in FIG. 2. One of these items is a security storage 60 which is a direct access storage device in which a data bank is stored, the data being of a kind which is to be imparted only to a restricted number of identifiable persons, i.e. the data is restricted information. The persons to whom this data or some of it may be imparted are identifiable by their possession of a key, such as the key 17, containing data matched by that stored in the computer key storage 14. To be identified such a person must locate his key 17 correctly in a request socket 48 in a terminal console 51 of a data terminal, i.e. an installation, usually remote from the main frame of the computer system, at which an operator may supply information to and request and receive information from a data bank of the computer system, in this case the data bank of the security storage 60. In FIG. 2 the request socket 48 and the terminal console 51 are for convenience shown merged with other parts of the computer system but in practice might be remote from such parts and connected thereto by a communications link which is preferably secure from tapping.

When the key 17 is correctly located in the request socket 48, its terminals 19 to 22 and 24 make electrical contact with corresponding terminals in the socket 48, the correct location of the key being indicated to the program control unit 11 by a mechanical sensor adapted to actuate a microswitch 46 connected in a circuit from the power supply control unit 16 to the program control unit. Closure of this circuit results in the application of a signal, designated the START READ AND COMPARE PROGRAM signal in FIG. 2, to a start input terminal 47 of the program control unit 11. The program control unit 11 is such that, on receiving this signal, it issues supply control signals through the supply control channel 39 to the power control unit 16, which in response thereto supplies a voltage of the appropriate magnitude and polarity to the respective read level power input terminals 24 and 34 of the key 17 and the computer key storage 14. This voltage is maintained while the program control unit 11 issues a READ and COMPARE signal which results in the reading of the data in the key 17 and its comparison with the data in the computer key storage 14 by a comparator 53.

The terminal console 51 has a plurality of manually operable inputs 52 and contains gating circuits controlled by OPEN and ALARM signals which are respectively supplied to the console 51 by the comparator 53 under differing conditions through an open signal channel 54 for the OPEN signals, and an alarm signal channel 55, for the ALARM signals. The alarm signal channel 55 is also connected to audio and visual alarm indicators installed at monitoring points to warn security staff that an attempt to obtain restricted information is being made by an unauthorised person, and to the program control unit 11 to initiate an alarm program which serves to render impossible further communication between the security storage 50 and at least the data terminal at which an unauthorised person is operating, the operation of the alarm program resulting in the transmission of suitable inhibiting signals from the program control unit 11 through a master control channel 56 to the terminal console 51. The data terminal which has thus been rendered inoperative can only be rendered operative again by a lengthy electrical and mechanical restoration process which, when satisfactorily completed, results in the transmission of a clearing signal from the terminal console through the master control channel 56 to the program control unit which causes the inhibiting signals to be terminated provided the ALARM signal is no longer present. It may be desirable for the alarm program to include the generation and application of signals which cause the room containing the terminal console to be locked so that the unauthorised person is automatically trapped.

When OPEN signals are supplied to the terminal console 51 through the open signal channel 54, the operator at the console is informed by means of a suitable signal issued by an indicator (not shown), for example a lamp, that he may operate the console's inputs 52 to obtain information from the security storage 60, the said gating circuits of the data terminal being appropriately set for an exchange of information between the console 51 and the security storage 60. It may also be arranged that signals are transmitted from the data terminal to the program control unit 11 to record, for example, the time, date, duration and nature of the operation of the data terminal.

In carrying out the read-and-compare program, the program control unit 11 issues, as mentioned before, a READ AND COMPARE signal to the key 17 and the computer key storage 17, which are meanwhile suitably powered from the power supply control unit 17, this signal being supplied to respective read-and-compare signal input terminals 62, 63 and 64 of the read-write gates unit 15, the comparator 53, and the address generation unit 12, as well as to the read signal input terminals 22 and 32 of the key 17 and the computer key storage 14, through a read-and-compare signal channel 61. When the read-write gates unit 15 receives a READ AND COMPARE signal, its gates are set to connect the data input/output terminals 30 of the computer key storage 14 respectively with computer key data input terminals 65 of the comparator 53. The signal also causes the key 17 and the computer key storage 14 to be set into respective conditions in which their stored data can be read out location by location as addresses are supplied, sets the addresses generation unit 12 in operation to generate all the addresses of the key 17 and the computer key storage 14 randomly, and actuates the comparator 53. The data which accordingly appears at the data input/output terminals 20 of the key 17 is supplied to key data input terminals 66 of the comparator 53 which are connected one-to-one to the terminals 20, and the data which appears at the data input/output terminals 30 of the computer key storage 14 is likewise supplied to the computer key data input terminals 65 of the comparator 53. If at any time during the reading out of the data in the key 17 there is a difference between the inputs to any pair of corresponding terminals in the two sets of terminals of the comparator 53, i.e. the set of key data input terminals 66 and the computer key data input terminals 65, the comparator 53 issues an ALARM signal. If this does not occur, so that there is complete correspondence between the data read out from the key 17 and that read out from the computer key storage 14, the comparator 53 issues an OPEN signal after all the addresses have been generated.

Those skilled in the art will be able to bring to mind suitable detailed circuitry for the various units of the computer system such as the program control unit 11, the address generation unit 12, the data generator 13, the computer key storage 14, the read-write gates 15, the power supply control unit 16, and other units of the system. The comparator 53 may comprise a set of respective AND-gates with an inverter in one input stage of each gate so that the presence of an output at any one or more of the AND-gates constitutes an ALARM signal, and a resettable counter adapted to provide an output signal constituting the OPEN signal on reaching full house when counting the number of locations of key 17 read. This counter can be reset automatically at the occurrence of an ALARM signal or the termination of operation of the terminal console 51.

Where it is desired that the information held in the security storage 60 should be composed of items of varying degrees of importance and that operators of the data terminal should be classified into groups whose respective access to this information differs from group to group, one group being allowed access to all the information, and the other groups being allowed access to respective fractions of the information of decreasing importance, the comparator 53 may be such as to contain means for inhibiting the issue of an ALARM signal until the contents of a key presented thereto have been compared with each of a plurality of computer key storages, each corresponding in data content to the data content of the keys of a respective one of the groups of operators. For example, the occurrence of an output at an AND-gate of the comparator serving to inform the program control circuit 11 that another computer key storage must be compared with the key in the socket 48, until either all the computer key storages have been read and no correspondence found, whereupon an ALARM signal is issued, or a correspondence is found and the address counting counter counts to full house. The set of AND-gates of the comparator can be, for such operation, be adapted to supply any outputs generated thereby to a monostable circuit coupled to a divider circuit, e.g. a scaler-counter, which will provide the ALARM signal after the monostable circuit having a suitable resetting time, has supplied a number of pulses to the divider circuit equal to the total number of computer key storages.

When utilising the security system it is arranged that no holder or user of a key knows what data is stored therein, and the key is such that only a lengthy and very intricate examination needing sophisticated electronic equipment can reveal what is stored in the key. Preferably it is arranged that the address generation unit 12 generates a different random order of the addresses every time it operates. The data generator 13 may be such as to generate a different random set of words every 48 hours and to store each set during the 48 hours following its generation so that each operator with a key is required to have its data erased and rewritten once every 48 hours to maintain access to the security storage 60.

Where the operators are classified into groups as aforesaid, a respective encode socket 18, computer key storage 14, and data generator 13 may be provided for each group.

The data stored in a key may be representative of, for example, letters, figures, words, or combinations thereof, made up from computer codes, for example, ECMA, ASCII, etc., and may be stored therein in a random sequence obtained from random number tables stored in the computer system, the sequence corresponding to a given writing operation being also temporarily stored for comparison purposes.

For a high degree of security it can be arranged that access to a security storage is only permitted after a plurality of keys containing the same or different sets of data have been presented, either in parallel or serially, to the computer system. These keys can be made physically different and complementary sockets for writing and reading each key provided in the computer system where required.

Where the operators are classified into a plurality of groups, the group which is permitted to have access only to information of a very low importance can be provided with keys which are fixed in their data content, e.g. by having it in the form of a permanent physical structure which can only be erased by electrical or mechanical destruction e.g. ML1301.

I claim:

1. In combination, a key means having a memory containing predetermined data words in predetermined storage locations, and a computer system having a security storage for privileged information and means for identifying the said data when the key is arranged to communicate with the system, said identifying means including a key storage memory containing the same data words as said key means in associated memory locations, the system further including means for rendering said security storage accessible only in response to favorable comparison of the data words in said key means and said key storage means, said key means comprising at least one random access permanent memory device.

2. The combination as claimed in claim 1, wherein the key means is such that data can be erased therefrom and written therein non-destructively, and the computer system includes means for erasing data in the key means and writing new data therein subsequently when the key means is presented to the system for erasure and writing.

3. The combination as claimed in claim 1, wherein the computer system includes means for providing warning indications and for rendering said security storage inaccessible if a key means is brought into communication with the system and the system is unable to identify the data therein through the comparison operation.

4. A method of operating a computer system including a storage containing privileged information, the method including the steps of bringing a key containing predetermined data words in predetermined memory locations into communication with the system, identifying the data by an operation of the system, whereby the data words in said key are compared with a similar group of data words stored in the computer for identification purposes, and providing access to the said privileged information only in response to favorable comparison of the data words in the key with the data words stored in the computer for the identification of the said data, the said key comprising at least one random access permanent memory device.

5. A method as claimed in claim 4, wherein the key is such that data can be erased therefrom and written therein non-destructively, and the computer system erases data in the key and writes new data therein subsequently when the key is presented to the system for erasure and writing.

6. A method as claimed in claim 4, wherein the computer system provides warning indications and renders the said storage inaccessible if a key is brought into communication with the system and the system is unable to identify the data therein.

7. Means for preventing unauthorized access to a source of security data in a computer system comprising an electronic key means comprising a random access memory means having a plurality of memory storage locations;

said computer system having a receptacle for removably receiving said key means to generate a start signal, when said receptacle receives said key means;

erasure means responsive to said start signal to erase the contents of said key means;

address generation means and data generating means responsive to the operation of said erasure means for respectively addressing the memory locations in a predetermined pattern, and for generating predetermined data words in a predetermined pattern;

said computer system including a key storage memory having at least as many memory storage locations as said key means;

said address generation means and said data generation means each being connected in common to said key means and said computer key storage means to store said each data word in the said memory locations in said key means and said computer key storage means.

8. The apparatus of claim 7 wherein said computer system further comprises means responsive to a data acquisition request and to the insertion of said key means into said receptacle for sequentially comparing respective memory locations in said key means and said computer key storage means;

said comparing means further comprising means for generating an enable signal to said source of security data to enable the contents of said data source to be read out therefrom only upon favorable comparison of data words in each and every memory location of said key means and said computer key storage means.

9. The apparatus of claim 7 wherein said memory locations are sensitive to ultra-violet radiation, said erasure means comprising means for irradiating said memory locations in said key means to ultra-violet radiation to erase the contents thereof.

10. A method for protecting the data in a security data source in a computer system from use by only authorized personnel through a key means insertable into a special receptacle provided in the computer system comprising the steps of erasing the contents of the key means which comprises a plug-in memory storage means when the key means is inserted into the receptacle;

generating predetermined data words in a predetermined sequence;

sequentially writing said data words in predetermined memory locations in the key means;

and simultaneously writing said data words in a key storage memory provided in the computer system at associated memory locations so that the data words and the memory locations of said data words are the same in both memories.

11. The method of claim 10 further comprising the steps of sequentially comparing the data words in each memory location of the key means with the data words in associated locations in the computer key storage memory when said key means is inserted into said receptacle and when a data source request is received; and transferring data words out of the data source only when all data words in the key means favorably compare with all words in the computer key storage means.

* * * * *